United States Patent
Madisetti et al.

(10) Patent No.: US 10,503,927 B1
(45) Date of Patent: *Dec. 10, 2019

(54) METHOD AND SYSTEM FOR SECURING CLOUD STORAGE AND DATABASES FROM INSIDER THREATS AND OPTIMIZING PERFORMANCE

(71) Applicant: Vijay Madisetti, Johns Creek, GA (US)

(72) Inventors: Vijay Madisetti, Johns Creek, GA (US); Arshdeep Bahga, Chandigarh (IN)

(*) Notice: Subject to any disclaimer, the term of this patent is extended or adjusted under 35 U.S.C. 154(b) by 0 days.

This patent is subject to a terminal disclaimer.

(21) Appl. No.: 16/506,285

(22) Filed: Jul. 9, 2019

Related U.S. Application Data

(63) Continuation of application No. 16/269,948, filed on Feb. 7, 2019, now Pat. No. 10,402,589.

(60) Provisional application No. 62/782,428, filed on Dec. 20, 2018.

(51) Int. Cl.
*G06F 21/62* (2013.01)
*G06F 16/95* (2019.01)

(52) U.S. Cl.
CPC .......... *G06F 21/6245* (2013.01); *G06F 16/95* (2019.01)

(58) Field of Classification Search
CPC ................................................ G06F 21/6245
See application file for complete search history.

(56) References Cited

U.S. PATENT DOCUMENTS

| | | | | |
|---|---|---|---|---|
| 9,032,017 B1* | 5/2015 | Singh | ............... | G06F 16/182 709/203 |
| 10,055,381 B2* | 8/2018 | Metzler | ............. | G06F 15/17331 |
| 2013/0167109 A1* | 6/2013 | Nucci | ....................... | G06F 9/44 717/105 |
| 2013/0219176 A1* | 8/2013 | Akella | ................ | H04L 63/0815 713/165 |
| 2014/0164758 A1* | 6/2014 | Ramamurthy | .......... | G06F 21/77 713/150 |
| 2015/0188949 A1* | 7/2015 | Mahaffey | ................ | H04L 63/20 726/1 |
| 2016/0283996 A1* | 9/2016 | Bakhshaie | ......... | G06Q 30/0613 |
| 2017/0041296 A1* | 2/2017 | Ford | ..................... | G06F 16/951 |
| 2017/0123677 A1* | 5/2017 | Singhai | ................ | G06F 16/174 |
| 2017/0180372 A1* | 6/2017 | Bezold | ................ | G06F 21/6209 |

* cited by examiner

*Primary Examiner* — Ali Shayanfar

(74) *Attorney, Agent, or Firm* — Daniel C. Pierron; Widerman Malek, PL

(57) ABSTRACT

A method of optimizing performance of and securing cloud storage and databases comprising analyzing data comprised by a data request by an agent application on a computerized device, the data request being generated by a client application and inserting a tag into the data request responsive to the analysis of the data comprised by the data request, the tag indicating storage requirements for at least one of security, access speed, or fault tolerance.

13 Claims, 16 Drawing Sheets

FIG. 13

METHOD AND SYSTEM FOR SECURING CLOUD STORAGE AND DATABASES FROM INSIDER THREATS AND OPTIMIZING PERFORMANCE

RELATED APPLICATIONS

This application is a continuation application of and claims priority under 35 U.S.C. § 120 of U.S. patent application Ser. No. 16/269,948 filed on Feb. 7, 2019 and titled Method and System for Securing Cloud Storage and Databases from Insider Threats and Optimizing Performance, which in turn claims priority under 35 U.S.C. § 119(e) of U.S. Provisional Patent Application Ser. No. 62/782,428 filed on Dec. 20, 2018 and titled Soter—Software Defined Storage for Securing and Optimizing Cloud Storage. The contents of these applications are incorporated herein by reference.

FIELD OF THE INVENTION

The present invention relates to cloud databases and cloud storage services where confidential and sensitive information are stored, more specifically, to systems and methods for securing cloud storage and databases from insider threats and optimizing performance.

BACKGROUND

Protecting confidential and sensitive information and digital objects (for example, digitally stored and manipulated information such as database records, digital documents, files, images, and other mechanisms that may contain information in digital form) stored in cloud storage and cloud databases has become increasingly challenging due to threats both internal and external to an entity that owns such digital objects. To deliver their intended value, these digital objects must remain available to be queried, retrieved, updated, shared, viewed, archived, and replicated. At the same time, the integrity of these digital objects must be maintained and their disclosure and/or loss must be prevented.

While known solutions in the art of cloud storage and database security provide basic security features such as access restrictions, authentication, authorization and encryption, such measures do not provide effective security mechanisms to prevent theft and/or copying of digital records and objects by insiders (i.e., persons and/or systems authorized to access stored objects) or by outsiders (i.e., persons and/or systems accessing these digital objects without authorization).

Insiders or Applications or IoT devices having unrestricted access to the cloud storage or database storing sensitive information (for instance, customer information, sales information, credit card lists and health records) can steal and leak the information to outsiders. As conducted by either an insider or an outsider, malicious leaking of digital objects may occur in the following forms:

a) Copying digital objects stored in cloud storage to a local machine and then to a USB drive;
b) Copying digital objects stored in cloud storage to a local machine and emailing them to third parties;
c) Copying digital objects stored in cloud storage and uploading digital objects to a cloud storage or an FTP server not trusted by the entity to whom the digital objects belong;
d) Copying the contents of a digital object stored in cloud storage and pasting those contents into a new digital object (e.g., an email);
e) Copying digital objects stored in cloud storage and then printing the contents of the digital objects;
f) Querying digital records stored in cloud databases in bulk and making local copies of the records;
g) Creating a local replica of an entire cloud database including all the database tables and records, and then leaking them by copying such replicas to a USB drive, emailing the replicas or uploading them to a cloud storage or an FTP server not trusted by the entity to whom the digital objects belong.

Maintaining confidentiality of information becomes even more difficult when digital records and objects are shared among multiple users authorized to work on the digital records and objects in a collaborative manner. Existing approaches for access control and digital object sharing do not have the flexibility to share digital objects, such as documents, for limited time duration. Once shared, known solutions allow digital objects to be accessed by the receivers without workable limits. For example, revoking access to shared digital objects is possible in solutions where a centralized or cloud-based access control and management system is used, and digital objects are shared from that system. However, this approach does not prevent the receiver from saving a copy of the digital object locally, from copying the contents to a new digital object on the local machine, and/or from emailing the contents to a third party.

Applications, Insiders or IoT devices having unrestricted access to the cloud storage and databases can retrieve sensitive information including digital records and objects. Known access control approaches based on Access Control Lists (ACLs) and Role-based Access Control (RBAC) systems fail to provide an effective line of defense against leaking of digital records and objects by a malicious insider who has the necessary authorizations to access the digital objects, or by an outsider who illicitly gains access to the digital objects.

Existing approaches for database security such as Database Activity Monitoring (DAM) monitor all database activity in real-time and provide alerts and reports on the activity. DAM are primarily used for compliance and monitoring purposes and can provide alerts on activity which has already occurred. DAM solutions can provide reports on any violations of existing access policies. However, DAM solutions are unable to enforce new access policies in real-time or make storage allocation decisions.

Existing approaches such as Distributed Tracing that are used for monitoring requests across a distributed system, add headers or trace IDs and span IDs to requests. With Distributed Tracing, we can track requests as they pass through multiple services, emitting timing and other metadata throughout, and this information can then be reassembled to provide a complete picture of the application's behavior at runtime. Distributed Tracing requires instrumenting the application with tracing SDKs or agents. Distributed Tracing is meant only for monitoring purposes.

Existing approaches such as Software Defined Storage (for example Veritas InfoScale) allow managing different types of storage, including spinning disks, solid state drives (SSDs), storage area network (SAN), direct attached storage (DAS), and just a bunch of disks (JBOD). Software-defined storage are designed to improve the application performance by virtualizing the back-end storage and transforming it into a pool of capacity that servers can utilize. Other Veritas Software tools, including Veritas Cognitive Object Storage, check for compliance of storage of certain types of data according to company policies, e.g., financial information should be stored in secure areas, but do not actively choose or reassign storage of financial information to secure locations, for example, as envisaged by certain embodiments of the present invention.

Existing approaches for monitoring cloud applications and microservices, use one of the following techniques for injecting trace IDs or intercepting requests for monitoring:

1. APM: Application performance management (APM) techniques require code embedded agents on all processes that tracks code execution path.

2. Tracing SDKs and Proxies: These techniques allow developers to embed tracing SDKs in the application code and use them to track entry points and exit calls. These SDKs don't look at code execution but instead just inject headers in requests to correlate.

3. OS Tracing: Operating systems provide various tracers that allow tracing not just the syscalls or packets, but also any kernel or application software.

Approaches 1 & 2 above, require instrumenting the application, whereas approach 3 doesn't need instrumentation.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method and system of protecting confidential and sensitive information and digital objects (for example, digitally stored and manipulated information such as database records, digital documents, files, images, and other mechanisms that may contain information in digital form) stored in cloud storage and cloud databases. In certain embodiments, the present invention may provide the following advantages:

1) Prevent loss and/or theft of digital records and objects due to either insiders or outsiders, and without perceptible loss of functionality relating to the digital records and objects. Such security includes the ability to identify at an organizational level certain threats at a particular location and/or a particular time instant or window, or both. Such security also employs patterns of access and/or usage as a library of patterns to assist in threat tracking and reaction/action based on context and threat levels.

2) Employ tracking and analytics capability within a cloud to identify behaviors based on activities on system-generated traces, and also for active and invasive analysis of requests.

3) Improve the performance of cloud applications by intelligently routing storage requests to either more faster storage options, more secure storage options or more fault-tolerant storage options.

4) Automatically choose storage allocation and access based on an application's pragma directives or configuration.

5) Allow proactive action with regard to threats to digital records and objects, including tracking of theft by insiders and/or outsiders, and also controlling destruction of a digital records and object prior to theft, loss, or disclosure. Both offensive and defensive approaches may be put in place through the use of analytics capabilities in the cloud.

The advantages described above are achieved by a secure software optimized storage system (SOTER), and associated methods, comprising the following components:

1) Soter Tracer: The Soter Tracer is instrumented into the application. Tracer creates spans when database access requests from a client application are received and attaches headers, tags, meta-data and context information to the spans in explicit version, or it can derive or infer "tags" using domain intelligence in the implicit version of Soter that can then insert these headers and meta-information unknown or transparently to the application or end-client user. The headers may be used to track requests as they pass through multiple services, emitting timing and other meta-data throughout, defined as tracing data, and this information can then be reassembled to provide a complete picture of the application's database access query-level behavior at runtime.

2) Soter Agent: The Soter Agent may be deployed on every host or server. The Soter Agent listens to the tracing data (including spans) which are injected in the instrumented application and forwards the traces to the Collector in the Soter Storage Intelligence service. Agent sends trace data asynchronously and outside the critical path to the Collector over UDP. Agent can insert these trace data in the implicit approach, if needed. When a proxy is used to inject traces instead of an instrumented application, the Soter Agent listens to the tracing data (including spans) which are injected in the intercepted requests/calls by the Soter Proxy and forwards the traces to the Collector.

3) Soter Storage Firewall: Soter Storage firewall is dynamic storage firewall that allows or block requests in real-time based on the nature of the current request and previous requests. The rules in firewall are updated based on real-time analysis of storage & retrieval requests such that any inappropriate, unapproved or malicious transactions, from a single source or multiple related sources, exceeding a threshold number of requests within a threshold time period, can be blocked or flagged for increased monitoring. E.g., if an insider or IOT device is trying to repeatedly query customer database and retrieve sensitive data, in some embodiments data of a single category or type (Social Security numbers, phone numbers, etc.), subsequent requests may be blocked. It is contemplated and included within the scope of the invention that the Soter Storage firewall may be a discrete piece of computer hardware or may be a virtual firewall executed on a computerized device that also executes other software.

4) Soter Storage Router: Storage Router identifies or inserts tags/headers that are associated with storage requests that allow it to choose between storage options such as (1) secure areas for storage of certain types of tagged data, or (2) faster locations for access, or (3) more fault-tolerant features. It is contemplated and included within the scope of the invention that the Soter Storage router may be a discrete piece of computer hardware or may be a virtual router executed on a computerized device that also executes other software.

5) Soter Storage Intelligence: Trace data is collected in the Collector component of the Soter Storage Intelligence service. Analysis of tagged requests or trace data is done in Analytics component of the Storage Intelligence service which collects and analyzes the traces and then updates the routing and firewall rules based on the analysis of requests and application's behavior at runtime. It is contemplated and included within the scope of the invention that the Soter Storage Intelligence service may be a discrete piece of computer hardware or may be a service executed on a computerized device that also executes other software.

6) Soter Monitoring Dashboard: The monitoring dashboard presents real-time monitoring information on requests, anomalous requests detected, threats identified and blocked.

7) Soter Proxy: The Soter Proxy acts like a trusted man-in-the-middle intercepting the storage requests or database calls. The Soter proxy creates traces for the intercepted calls and sends the traces to the Soter Agent. By using a proxy, there is no need to instrument the application with tracers. The proxy is able to intercept the client-server communication (such as database queries (n SQL, for example) or calls and requests to store data items/objects in a cloud database or storage) and inject traces.

While existing approaches such as Distributed Tracing are meant only for monitoring purposes, the SOTER approach can be used not just for observing or monitoring, but can also play an active role through use of headers that are read and updated along the request path. The SOTER approach also supports tags inserted by domain experts who know certain items need more speed, more safety, more protection, or more fault tolerance. For example, credit card data need to be stored in protected areas, and their transactions should be fast. The Soter Storage Router can choose between storage options such as Cloud Object Storage (such as AWS S3) or NoSQL database (such as DynamoDB or MongoDB) or SQL database (such as MySQL on RDS), within a cloud computing environment, for instance, using these tags (explicit mechanism). Alternatively, in the implicit approach the Soter Storage Router can derive the "tags" implicitly using "domain information". For example, it uses knowledge or Artificial Intelligence (AI) to determine that "financial information" or "personal information" must be stored in secure containers or trusted areas, as opposed to generic program state information that need not be stored in protected areas.

A database or cloud storage equipped with Soter components handles the QoS issues transparently based on the headers. Headers are used for storage (data in rest), where the headers route the information to more secure areas, or more fast access areas or more reliable areas or where they can be monitored. Soter does invasive analysis and optimization and not just passive tracing of requests.

Existing approaches such as Software-defined storage can improve the application performance by virtualizing the back-end storage and transforming it into a pool of capacity that servers can utilize. However, the SOTER approach allows more fine-grained control over the storage locations for individual data records/objects through use of headers that are read and updated along the request path.

Additionally, embodiments of the invention are directed to a method of organizing client application data comprising receiving a client application database access request for creating or modifying client application data from a client application executing on a computerized device at a cloud-based server, deriving a tag associated with the client application database access request at a storage router, the tag indicating storage requirements for at least one of security, access speed, or fault tolerance, receiving tracing information related to the client application database access request at a storage intelligence service, defining received tracing information in terms of the tag and client application attributes comprising at least one of users, roles, privileges, database access patterns, and usage characteristics, storing the received tracing information in a cloud-based trace storage database, analyzing the trace storage database to develop updated rules for client application database access requests, and updating the storage intelligence service with the updated rules. The method may further comprise mapping the client application database access request at the storage router to a corresponding server database access request record created or modified responsive to the tag derived from the client application database access request and a rule comprised by the storage router and storing the mapping in a cloud-based mapping database. The method may further comprise receiving a client database read access request from a client application, receiving tracing information associated with the client database read access request from the client application at the storage intelligence service, and routing the client database read access request from the client application based on the rules stored in the storage intelligence service and the mapping database to a corresponding cloud-based server database record. The method may additionally comprise receiving data from the corresponding cloud-based server database record responsive to the client database read access request, defining retrieved data and transmitting the retrieved data to the client application.

In some embodiments, the step of deriving a tag associated with the client application database access request at the storage router may comprise determining the client application database access request does not have a tag assigned thereto, analyzing the data comprised by the client application database access request, and inserting a tag into the client application database access request responsive to the analysis of the data comprised by the client application database access request. The step of deriving a tag associated with the client application database access request at the storage router may comprise identifying a tag comprised by the client application database access request.

In some embodiments, the mapping database may be organized as a distributed hash table. The mapping database may be replicated for fault-tolerance and availability.

In some embodiments, the method may further comprise determining a probable future client database read access request responsive to the tag and the tracing information associated with the client application database access request at the storage intelligence service.

In some embodiments, the method may further comprise receiving a plurality of client database read access requests from a single source at the cloud-based server, receiving tracing information for each of the plurality of client database read access requests at the storage intelligence service, analyzing the tracing information associated with the plurality of client database read access requests at the storage intelligence service to determine if a threshold number of requests within a threshold time period is exceeded, and, upon determining the threshold number of requests within the threshold time period is exceeded, flagging subsequent client database read access requests from the source for increased monitoring.

In some embodiments, the method may further comprise receiving a plurality of client database read access requests from a single source at the cloud-based server, receiving tracing information for each of the plurality of client database read access requests at the storage intelligence service, analyzing the tracing information associated with the plurality of client database read access requests at the storage intelligence service to determine if a threshold number of requests for read access of data a single category is exceeded, and, upon determining the threshold number of requests for read access of data of a single category is exceeded, flagging subsequent client database read access requests from the source for increased monitoring.

In some embodiments, the data comprised by either of the client application database access request or the client database access read request may be formatted for a first database type, and the method may further comprise determining if the first database type matches a database type associated with a database type of the corresponding server database access request record and, upon determining the first database type does not match the database type of the corresponding server database access request record, converting the first database type to a second database type that matches the database type of the corresponding server database access request record. The first database and second database types may be one of a SQL or a NoSQL type.

In some embodiments, the retrieved data may not comprise or may exclude information indicating a geographic location or an internet protocol location of the server comprising the cloud-based server database record.

In some embodiments, receiving the client application database access request may comprise receiving the client application database access request at a load balancer, adding tracing information to the client application database access request responsive to receiving the client application database access request at the load balancer, defined as load balancer tracing information, sending the load balancer tracing information to the storage intelligence service, sending the client application database access request to an application server of a plurality of application servers, receiving the client application database access request at the application server of the plurality of application servers, adding tracing information to the client application database access request responsive to receiving the client application database access request at the application server, defined as application server tracing information, and sending the application server tracing information to the storage intelligence service.

Further embodiments of the invention are directed to a method of optimizing performance of and securing cloud storage and databases comprising analyzing data comprised by a data request generated by a client application by an agent application on a computerized device, inserting a tag into the data request responsive to the analysis of the data comprised by the data request, the tag indicating storage requirements for at least one of security, access speed, or fault tolerance, identifying tracing information added to a data request transmitted by the client application, and transmitting the tracing information to a storage intelligence service.

In some embodiments, the tracing information may be transmitted to the storage intelligence service a pathway other than a pathway through which the data request was transmitted. The tracing information may comprise one or more of a span and a trace. The agent application may be executed by one of a client computerized device, a load balancer, a proxy server, or an application server. The method may further comprise adding tracing information to the data request.

BRIEF DESCRIPTION OF THE DRAWINGS

FIG. 13 is an illustration of an example of using a Soter Storage Router, according to an embodiment of the invention.

DETAILED DESCRIPTION OF THE INVENTION

Figure 1:
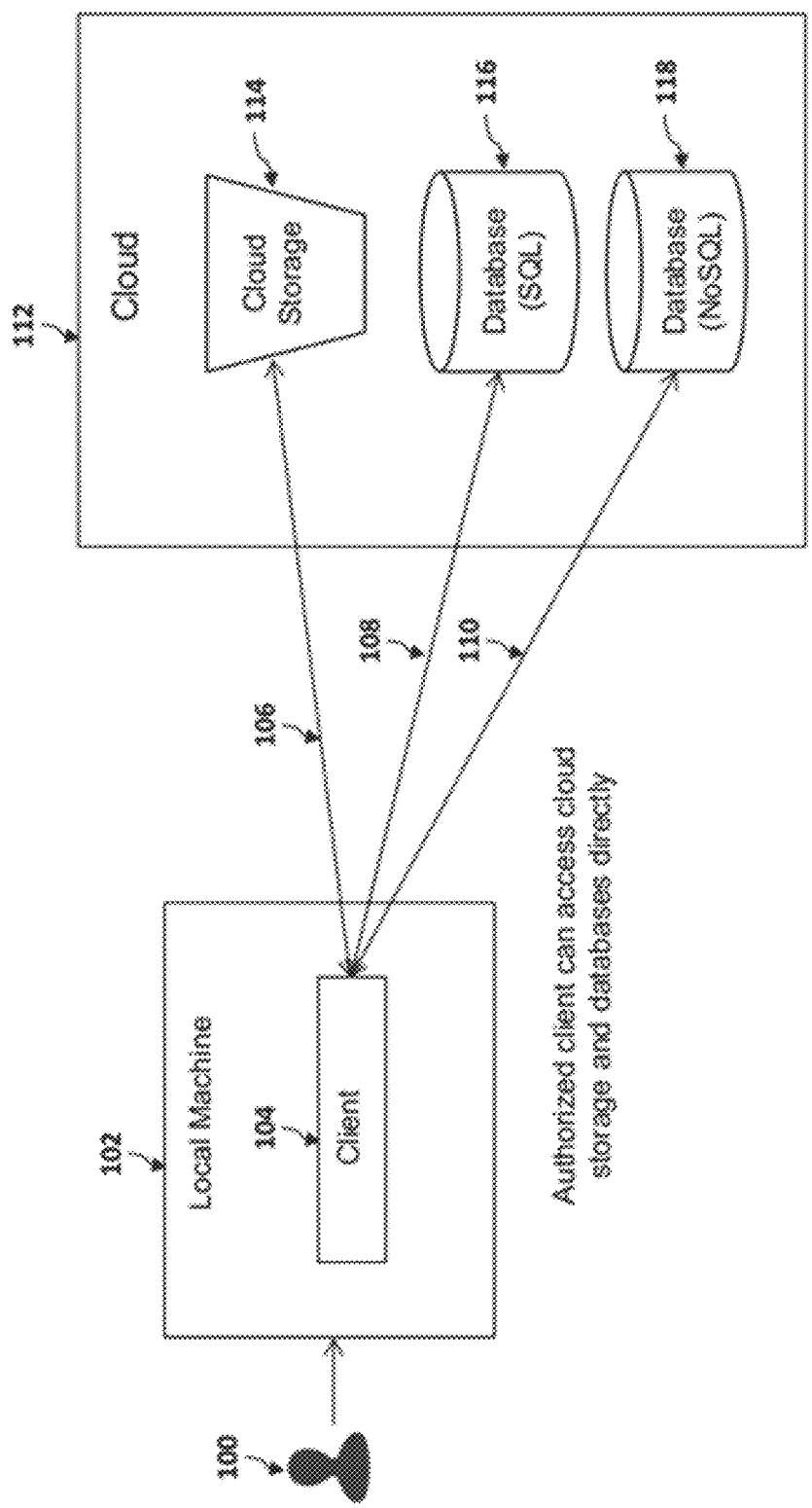
FIG. 1 is an illustration of an existing approach for data storage and with direct access to stored data, according to an embodiment of the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Additionally, while particular computer architectures may not be specifically disclosed for various computerized devices, it is understood that such devices may comprise at least a processor operable to execute commands and operate software, including operating systems, individual programs, services, and the like. Moreover, such computerized devices may comprise a memory positioned in communication with the processor operable to provide non-transitory storage of software comprised by the computerized device. Furthermore, the such computerized devices may further comprise a network communication device operable to send and receive data across to a remote computerized device, in some instances across a network. Such networks may include personal area networks (PANs), local area networks (LANs), wide area networks (WANs), such as the Internet, and cellular networks, including 4G and 5G networks. Such network communication devices include, but are not limited to, wireless communication devices, including those conforming to IEEE 802.xx standards, such as Bluetooth, WiFi, WIMAX, and the like, Ethernet devices, serial communication devices, parallel communication devices, cellular network communication devices, fiber optic communication devices, and the like.

Referring to FIGS. 1-11, a secure software optimized storage system (SOTER) system for securing cloud storage and databases from insider threats and optimizing performance, according to an embodiment of the present invention is now described in detail. Throughout this disclosure, the present invention may be referred to as a secure software optimized storage system, a digital object protection system, a management system, a protection system, an access control system, a device, a system, a product, and a method. Those skilled in the art will appreciate that this terminology is only illustrative and does not affect the scope of the invention.

An embodiment of the invention, as shown and described by the various figures and accompanying text, provides a system and associated methods for securing cloud storage and databases from insider threats and optimizing performance and to achieve secure manipulation and management of digital records and objects stored in cloud storage and cloud databases. Those skilled in the art will appreciate that the present invention contemplates the use of computer instructions and/or systems configurations that may perform any or all of the operations involved in secure digital records and object management. The disclosure of computer instructions collectively identified by the named subsystems described herein is not meant to be limiting in any way.

Those skilled in the art will readily appreciate that stored computer instructions and/or systems configurations may be configured in any way while still accomplishing the many goals, features and advantages according to the present invention.

Referring now to FIG. 1, an illustration of an existing approach for data storage and with direct access to stored data, is described in more detail. A user 100 can access cloud storage 114 and databases 116, 118, collectively the cloud 112 directly using an authorized client 104 installed on the user's local machine 102. The user 100 who has unrestricted access 106, 108, 110 to the cloud storage 114 or database 116, 118 storing sensitive information (such as customer information, sales information, credit card lists, etc.) can steal and leak the information to outsiders.

Figure 2:
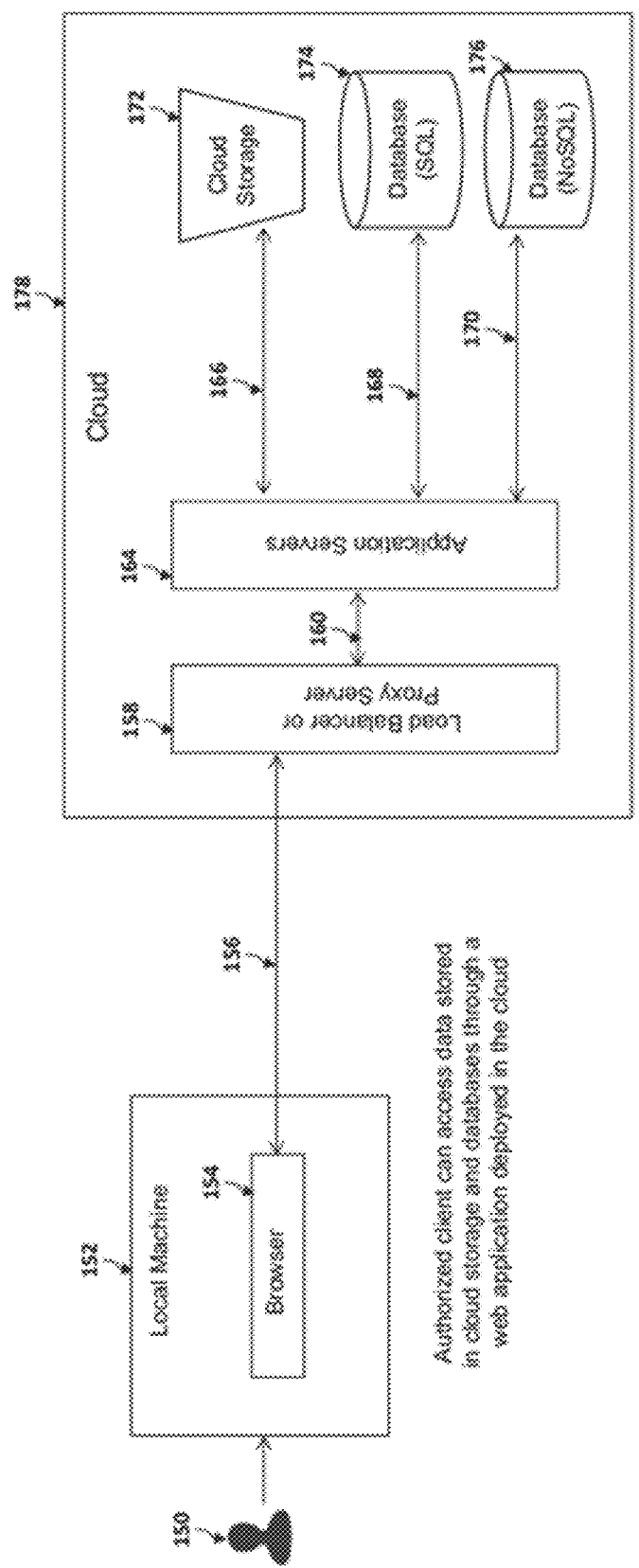
FIG. 2 is an illustration of an existing approach of storing or access to stored data through a web application using REST or SoA/SOAP, according to an embodiment of the invention.

Referring now to FIG. 2, an illustration of an existing approach of storing or access to stored data through a web application using REST or SoA/SOAP, is described in more detail. A user 150 can access 156, 166, 168, 170 data stored in cloud storage 172 and databases 174, 176, collectively the cloud 178, through a web application deployed on application servers 164, in some instances via 160 an optional load balancer or proxy server 158, in the cloud 178 through a browser 154 installed on the user's local machine 152. A user (insider, application or a device) having unrestricted access to the web-based REST/SOAP storage databases through applications can steal and leak the enterprise or financial information to outsiders.

Figure 3:
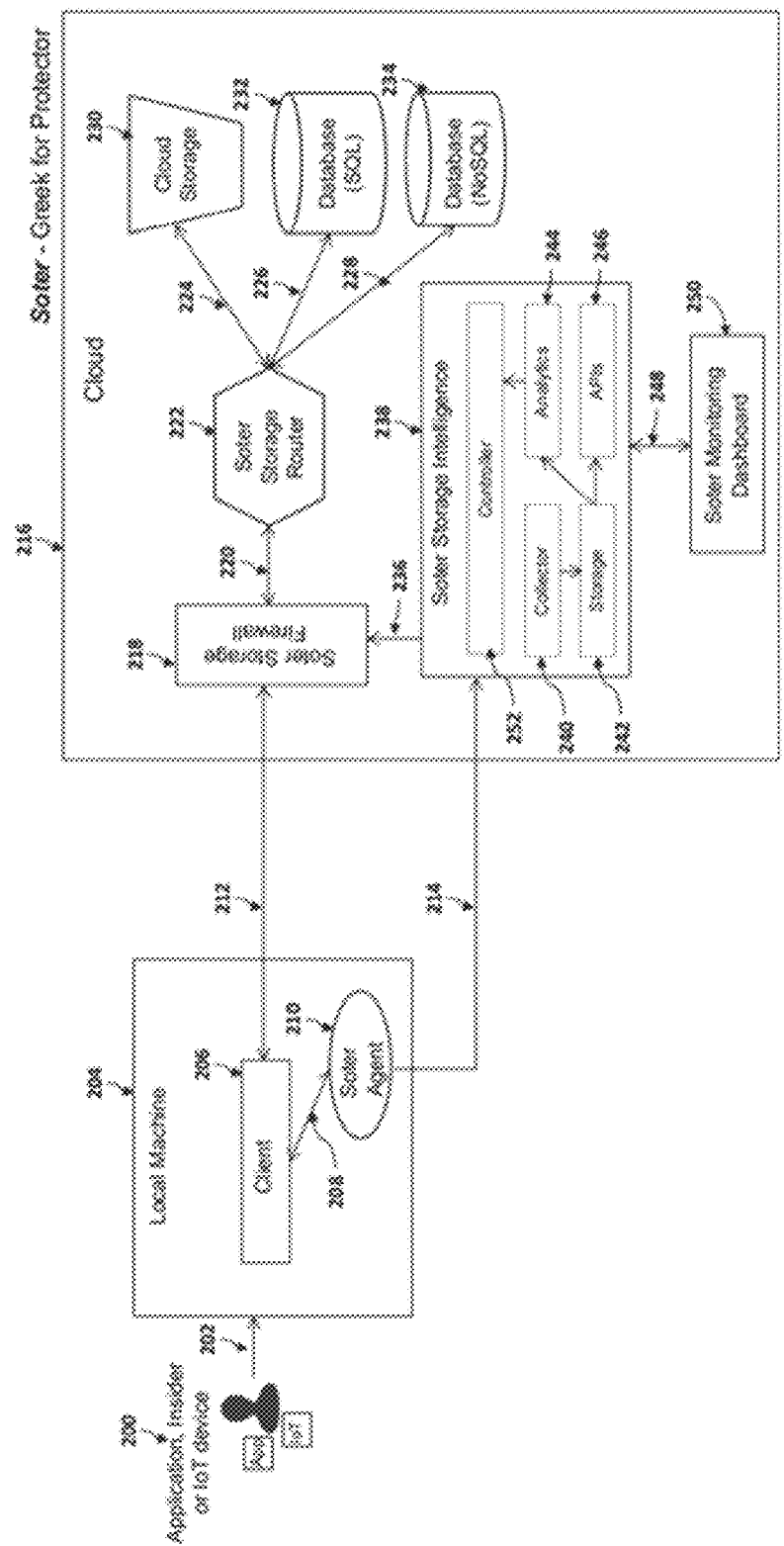
FIG. 3 is an illustration of the explicit version of the Soter Software Optimized Storage approach, according to an embodiment of the invention.

Referring now to FIG. 3, an illustration of the explicit version of the Soter Software Optimized Storage approach, is described in more detail. An Application, Insider or IoT device 200 accesses a client application 206 running on the local machine 204. The client application 206 sends a request 212 to the cloud 216 to store new data records/objects or retrieve existing records/objects. The Soter Storage Firewall 218 allows or blocks requests, or otherwise regulates application data access in real-time based on the nature of the current request and previous requests. In some embodiments, requests may be flagged for enhanced, additional, or increased monitoring for potential abuse. The allowed requests are sent 220 to the Soter Storage Router 222 which identifies or inserts tags/headers that are associated with storage requests that allow it to choose between storage options such as (1) secure areas for storage of certain types of tagged data, or (2) faster locations for access, or (3) more fault-tolerant features. The Soter Storage Router 222 may route 224, 226, 228 the request to a data storage location, such as Cloud Storage 230, an SQL Database 232 or a NoSQL Database 234. The Soter Agent 210 is deployed on the local machine 204 along with the client application 206. The agent 210 listens 208 to the tracing data (including spans) which are injected in the instrumented client application 206 and forwards 214 the traces to the Collector 240 in the Soter Storage Intelligence service 238. The tracing data may comprise at least one of users, roles, privileges, database access patterns and usage characteristics. Agent sends trace data asynchronously and/or outside the critical path (e.g. utilizing different transmission resources through the Internet) to the Collector over UDP. Agent can insert these trace data in the implicit approach, if needed. The collector 240 stores the trace information in trace storage 242. The Analytics component 244 analyzes the trace information of the requests in real-time. The Analytics component 244 may use various machine learning, deep learning and artificial intelligence (AI) models to generate rules for matching requests and adding new tags implicitly based on the data within a request. For example, the Analytics component 244 may use AI to identify application data, such as credit card numbers being referenced, from the request data queries and tag them implicitly as "Secure". For the Analytics component 244, machine learning or deep learning models can be trained to identify malicious operations (such as bulk querying of sensitive database records). These models can then be used to generate new rules which are updated 236 within the Soter Storage Firewall 218 or Soter Storage Router 222. The Controller component 252 updates the routing rules in the Soter Storage Router 222 and firewall rules in the Soter Storage Firewall 218 based on the analysis of requests and application's behavior at runtime, so that any inappropriate, unapproved or malicious transactions can be blocked. For example, if an application, insider or IoT device is trying to repeatedly query customer database and retrieve sensitive data, subsequent requests may be blocked. Soter Storage Intelligence service 238 may provide various APIs 246 for integration with other cloud services. The Soter Monitoring Dashboard 250 can access 248 the Soter Storage Intelligence service 238 and presents real-time monitoring information on requests, anomalous requests detected, threats identified and blocked.

In some embodiments, at least one of the Soter Storage Router 222 and the Soter Storage Intelligence service 238 may be operable determine a probable future client database read access request responsive to the tag and the tracing information associated with the client application database access request at the storage intelligence service. Such a determination may result in changes to the routing of future requests and updating of the rules accordingly.

Figure 4:
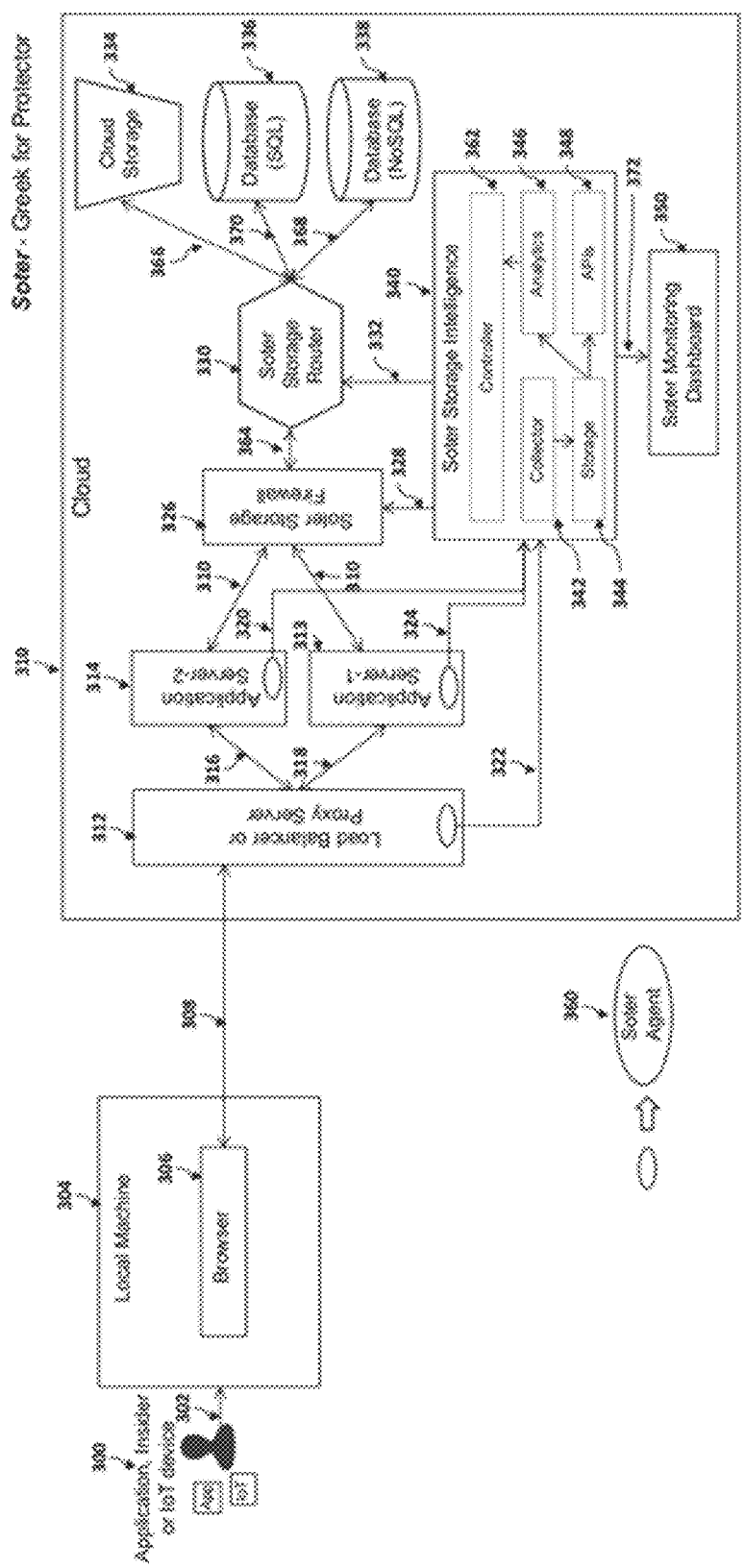
FIG. 4 is an illustration of the Soter Software Optimized Storage approach, according to an embodiment of the invention.

Referring now to FIG. 4, an illustration of the Soter Software Optimized Storage approach, is described in more detail. An Application, Insider or IoT device 300 accesses a web client running on the application servers 313, 314 in the cloud computing environment 310 using a browser 306 installed on a local machine 304. The requests are sent 308 from the browser 306 to the Load Balancer or Proxy Server 312 which forwards 316, 318 the requests to the application servers 313, 314. The application servers 313, 314 may forward 310 the requests to the Soter Storage Firewall 326 which allows or block requests in real-time based on the nature of the current request and previous requests. The Soter Storage Firewall 326 may be selectively included or excluded in the Soter architecture. The allowed requests are sent 364 to the Soter Storage Router 330 which identifies or inserts tags/headers that are associated with storage requests that allow it to choose between storage options such as (1) secure areas for storage of certain types of tagged data, or (2) faster locations for access, or (3) more fault-tolerant features. The Soter Storage Router 330 may route 366, 368, 370 the request to a data storage location, such as, for example, Cloud Storage 334, an SQL Database 336, or a NoSQL Database 338. In some embodiments, when data is returned from the data storage location to the local machine 304, it may not include/exclude location information about the data storage location, such as, but not limited to, an internet protocol (IP) address, a geographic location, or other identifying information about the data storage location. The Soter Agent 360 is deployed on every host or server including the load balancer or local proxy and the application servers. The agent 360 listens to the tracing data (including spans) which are injected in the instrumented client application and forwards 320, 322, 324 the traces to the Collector 342 in the Soter Storage Intelligence service 340. Agent 360 sends trace data asynchronously and outside the critical path to the Collector 342 over UDP. Agent 360 can insert these trace data in the implicit approach, if needed. The Collector 342 stores the trace information in trace storage 344, a cloud-based database. The Analytics component 346 analyzes the trace information of the requests in real-time. The Analytics component 346 may use various machine learning, deep learning and artificial intelligence (AI) models to generate rules for matching requests and adding new tags implicitly based on the data within a request. For example, the Analytics component 346 may use AI to identify credit card numbers from the requested application data accesses and tag them implicitly as "Secure". For the Analytics component 346, machine learning or deep learning models can be trained to identify malicious operations (such as bulk querying of sensitive database records). These models can then be used to generate new rules which are updated 328, 332 within the Soter Storage Firewall 326 or Soter Storage Router 330. The Controller component 362 updates the routing rules in the Soter Storage Router 330 and firewall rules in the Soter Storage Firewall 326 based on the analysis of requests and application's behavior at runtime, so that any inappropriate, unapproved or malicious transactions can be blocked. For example, if an application, insider or IoT device is trying to repeatedly query customer database and retrieve sensitive data, subsequent requests may be blocked. Soter Storage Intelligence service 340 may provide various APIs 348 for integration with other cloud services. The Soter Monitoring Dashboard 350 may access 372 the Soter Storage Intelligence service 340 and presents real-time monitoring information on requests, anomalous requests detected, threats identified and blocked.

Figure 5:
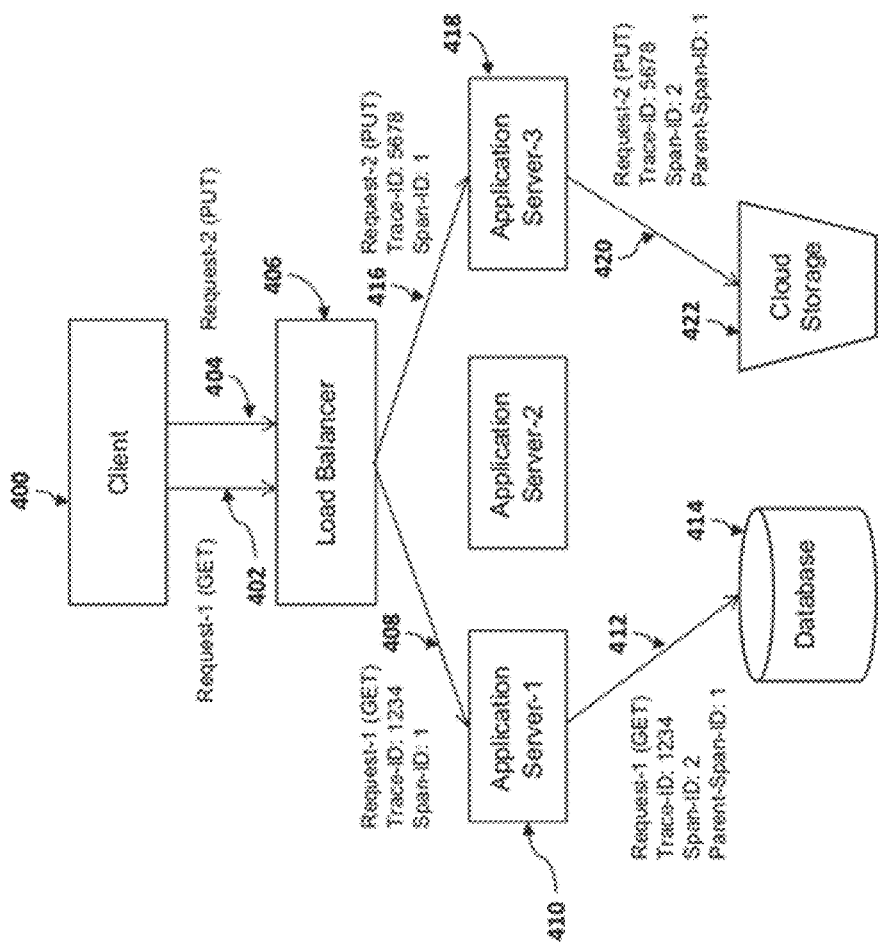
FIG. 5 is an illustration of tracing requests in the Soter Software Optimized Storage system, according to an embodiment of the invention.

Referring now to FIG. 5, an illustration of tracing requests in the Soter Software Optimized Storage system, is described in more detail. A client 400 sends an HTTP GET request 402 to retrieve records from a database. When the request reaches the load balancer 406, the Soter agent on the load balancer injects tracing information to the request. The tracing information may include the following:

a) Span: A span is a logical operation such as a method call or HTTP RESTful call. A span has a start and end time. Spans may define relationship to other spans (parent/child). Span is identified by a Span-ID.

b) Trace: Trace is a set of spans associated with the same request. Trace is identified by a Trace-ID. The Trace-ID remains the same as request propagates through various services.

c) Context/Meta-data: In addition to Trace and Span IDs, additional meta-data or context information related to the request may be propagated across spans. Meta-data related to speed, fault tolerance, security, traceability, chose storage allocation, and access based on application's requirements.

The optional load balancer 406 forwards 408 the GET request 402 to the application server-1 410. The application server-1 410 then sends 412 the request to the database 414. The same process is followed for the PUT request-2 404 sent 404 by the client 400 to put an object to a cloud storage. When the request reaches the load balancer 406, the Soter Agent on the load balancer injects tracing information to the request. The load balancer 406 forwards 416 the PUT request 404 to the application server-3 418. The application server-3 418 then sends 420 the request to the cloud storage 422. At each step, the tracing information is updated as a request propagates through multiple services emitting timing and other meta-data throughout.

Figure 6:
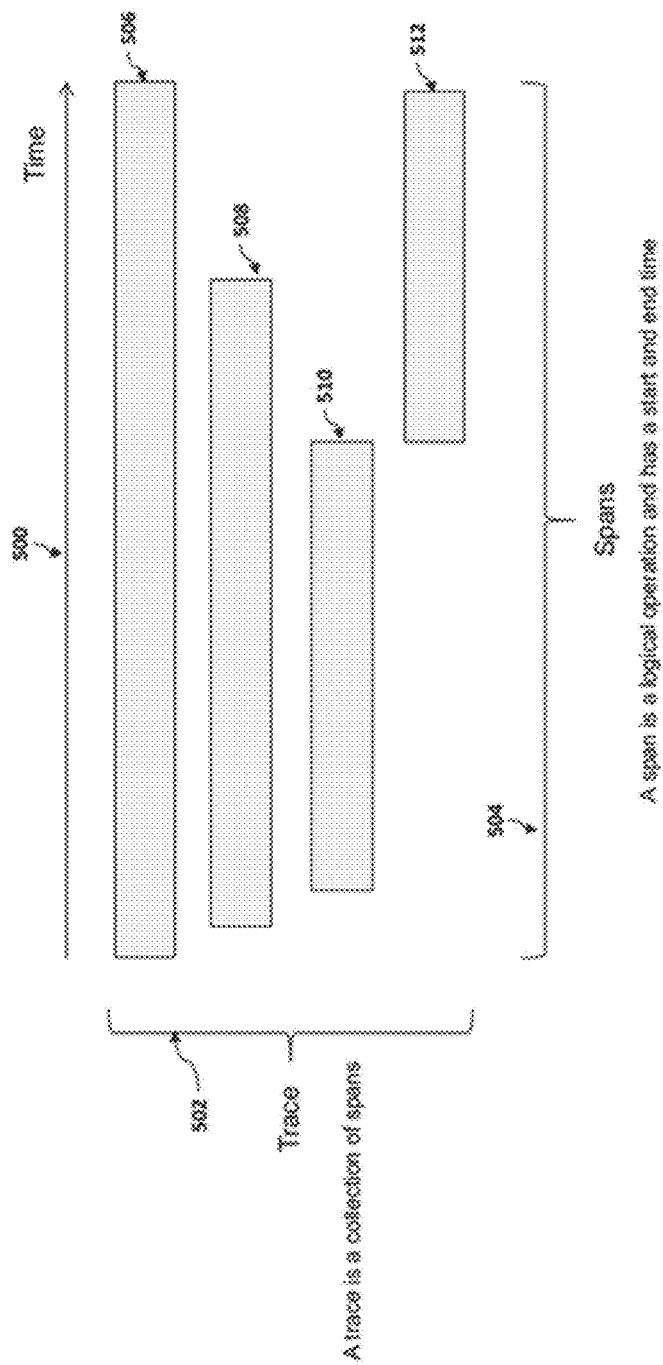
FIG. 6 is an illustration of a Trace and Span, according to an embodiment of the invention.

Referring now to FIG. 6, an illustration of a Trace and Span, according to an embodiment of the invention. A span is a logical operation and has a start and end time. A trace 502 is a collection of spans 506, 508, 510 and 512.

Figure 7:
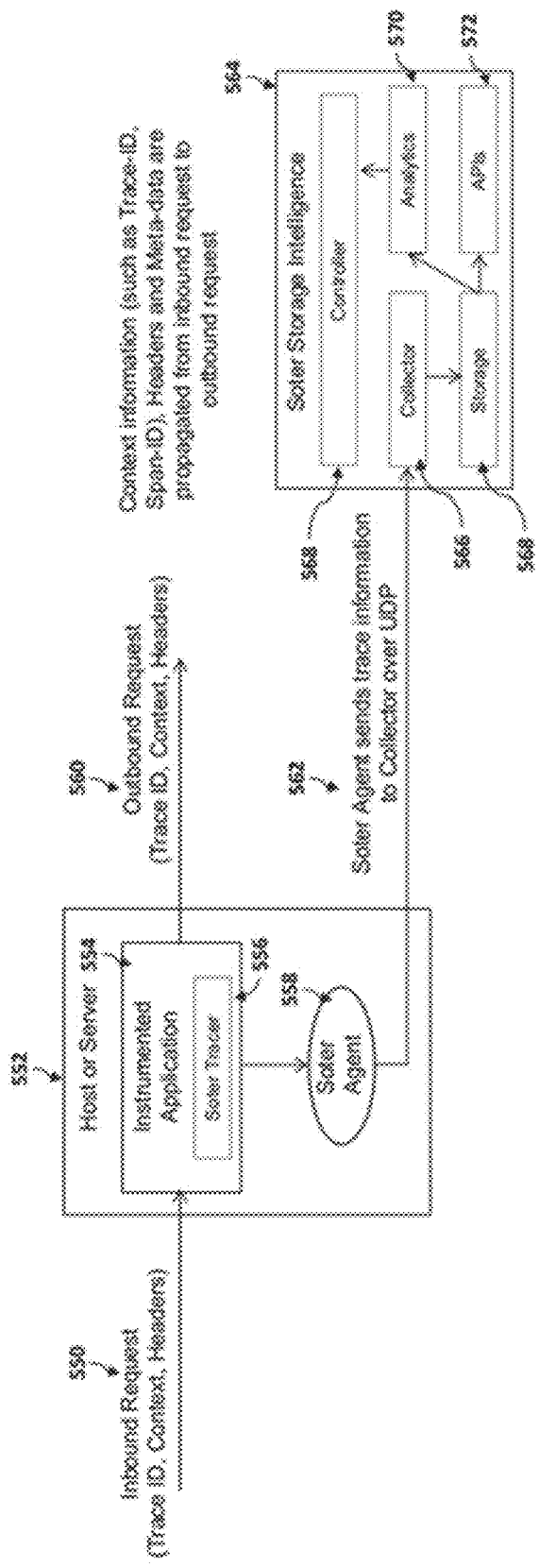
FIG. 7 is an illustration of an example of instrumenting an application and collecting traces, according to an embodiment of the invention.

Referring now to FIG. 7, an illustration of an example of instrumenting an application and collecting traces, is described in more detail. As an Inbound Request 550 arrives a host or server 552, the instrument application 554 running on the host or server 552 injects tracing information 556 to the request. The inbound request may already contain tracing information such as Trace ID, Context and Headers, which is propagated to the Outbound Request 560. The Soter Agent 558 installed on the host or server 552, sends 562 the trace information to the Collector 566 over UDP in the Soter Storage Intelligence Service 564. The Collector 566 stores the trace information in trace storage 568. The span context (including span ID, trace ID, tags) are propagated from the incoming request to outgoing request. All other tracing information (such as span operation name and span logs) are not propagated. Instead the sampled tracing information is transmitted out of process asynchronously, in the background, to Soter Agents.

Figure 8:
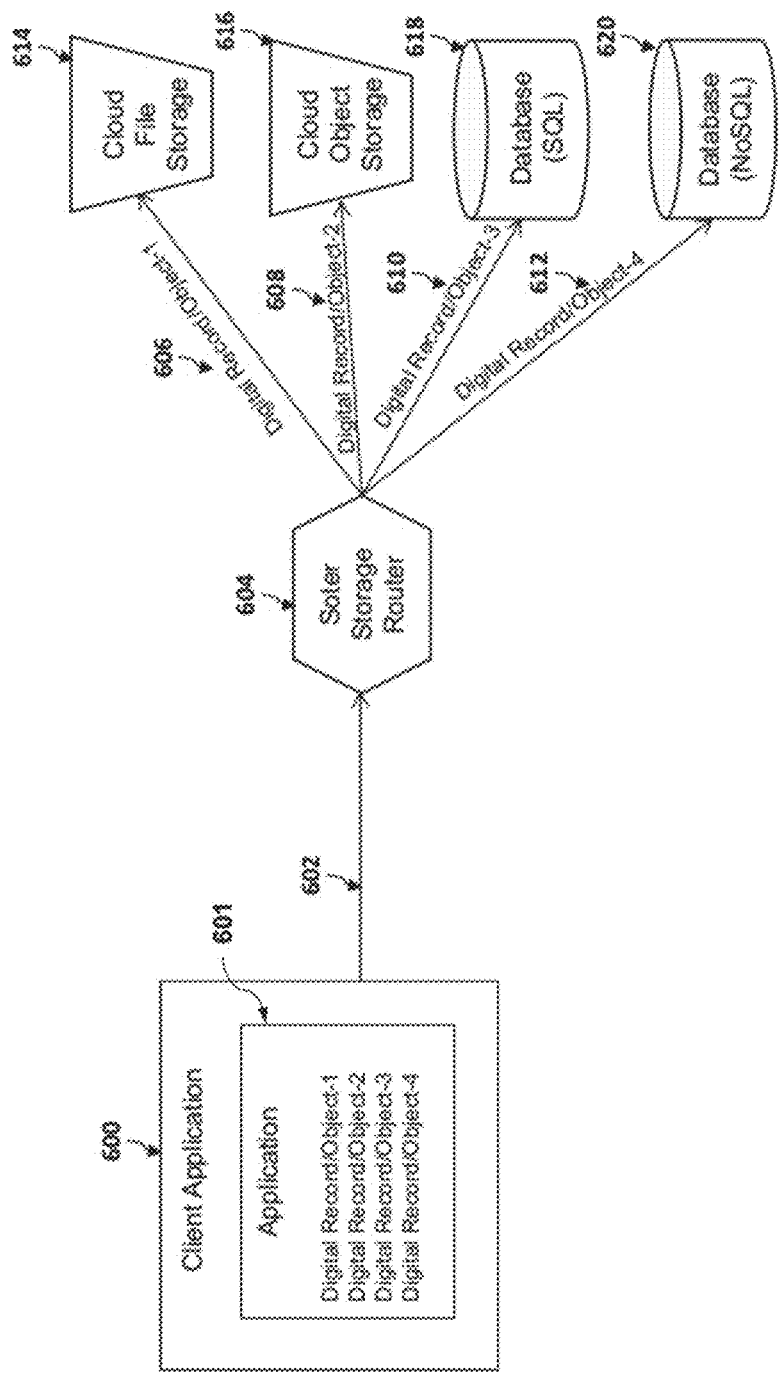
FIG. 8 is an illustration of the routing data to different storage locations within the Soter system, according to an embodiment of the invention.

Referring now to FIG. 8, an illustration of the routing data to different storage locations within the Soter system, is described in more detail. An application 601 running on a client computer 600 sends 602 Digital Records or Objects to be stored in the cloud. The requests to store the records or objects are interpreted by the Soter Storage Router 604 which routes 606, 608, 610, 612 to the request to the appropriate storage location such as a Cloud File Storage 614, Cloud Object Storage 616, SQL Database 618 or a NoSQL Database 620.

Figure 9:
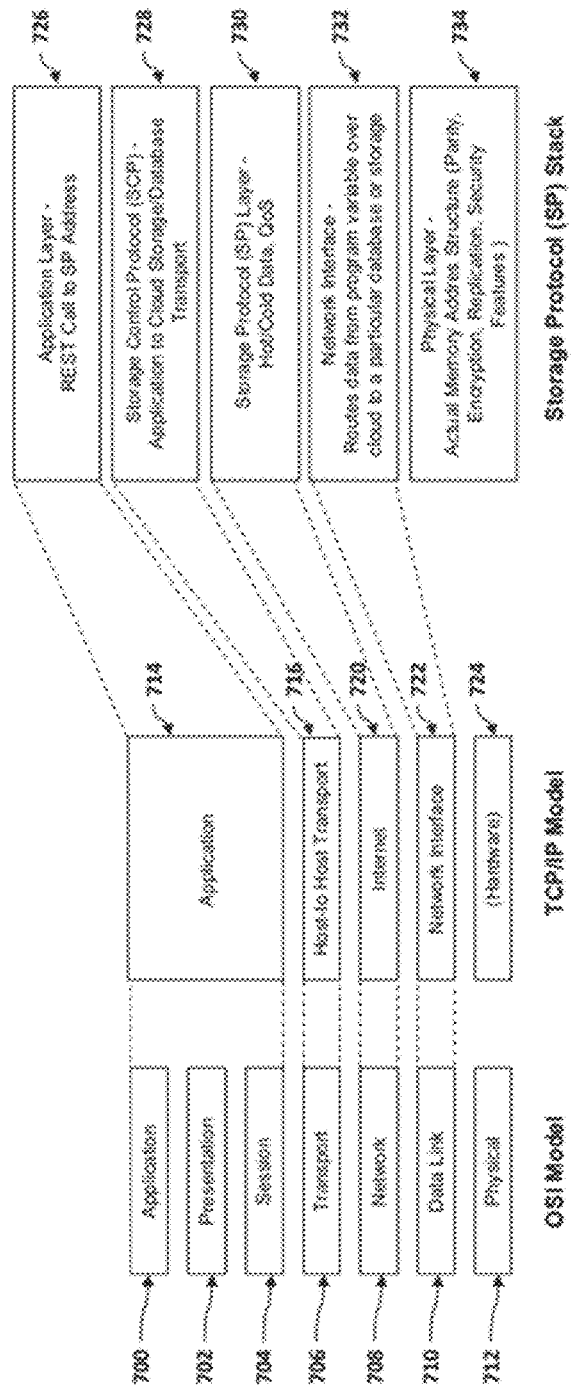
FIG. 9 is an illustration of the Soter Storage Protocol Stack, according to an embodiment of the invention.

Referring now to FIG. 9, an illustration of the Soter Storage Protocol Stack, is described in more detail. The Soter Secure Software Optimized Storage system may use a Storage Protocol stack or model as shown in FIG. 9 which is analogous to a TCP/IP model (714-724), which itself conforms to an OSI Model (700-712). The Storage Protocol (SP) stack may include the following layers:

a) Application Layer 726: At the application layer 726, the data to be stored is encoded and sent over an HTTP (REST) call to an SP Address b) Storage Control Protocol (SCP) Layer 728: The SCP Layer 728 splits the data into manageable chunks and adds port number information. SCP layer 728 specifies the Application to Cloud Storage/Database Transport.

c) Storage Protocol (SP) Layer 730: adds SP addresses stating where the data is from and where it is going. This layer defines structures to identify type of data (Hot/Cold, Fast/Slow, etc.) and the Quality of Service (QoS).

d) Network Layer 732: The network layer 732 defines the addressing and routing structures used in Storage Control Protocol (SCP) 728 which are used to route data from program variables over cloud to a particular database or storage.

e) Physical Layer 734: The Physical layer 734 adds the actual memory address structure (Parity, Encryption, Replication, Security Features) and specifies which device the data came from, and which device the message the data is going.

Soter Extensions—Can use a Storage Stack, that is modeled after the TCP/IP stack, but instead is used to route data/information to storage endpoint. This storage stack can be encapsulated and/or tunneled over TCP/UDP/MPLS/IP stack and TLS type secure networking protocols.

Figure 10:
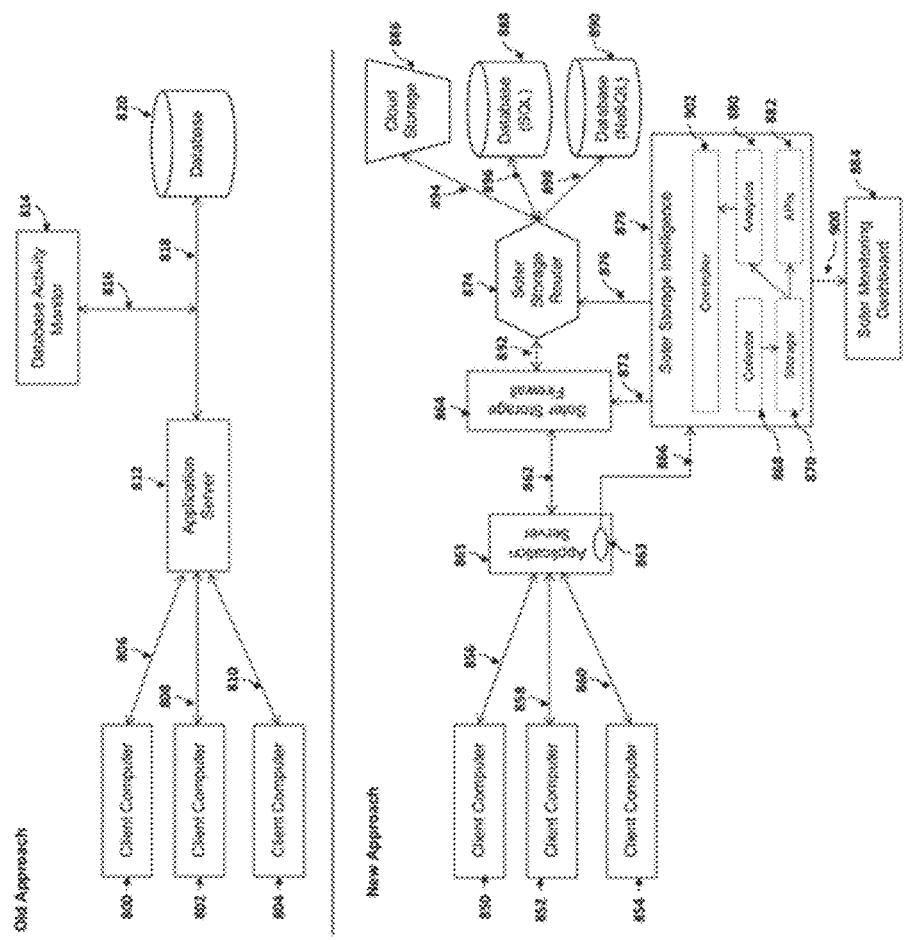
FIG. 10 is an illustration of database activity monitoring (old approach) and the secure software optimized storage (new approach), according to an embodiment of the invention.

Referring now to FIG. 10, a comparison of database activity monitoring (old approach) and the secure software optimized storage (new approach), is described in more detail. Existing approaches such as Database Activity Monitoring (DAM) monitor all database activity in real-time and provide alerts and reports on the database activity. DAM solutions implement monitoring using the following approaches: (a) at the network-level by detecting the SQL commands used, (b) using agents installed on the database which record and report database access information, (c) using a proxy which intercepts all the incoming and outgoing commands to a database. In a DAM approach, client computers 800, 802, 804 make requests 806, 808, 810 to an application server 812. The application server 812 sends 818 commands to access the database 820 to retrieve the information requested by the clients, update the information or create new records. A database activity monitor 814 monitors 816 the requests to the database using one of three approaches (network-level, agent or proxy) described above. While, DAM solutions can provide reports on any violations of existing access policies, however, they are unable to enforce new access policies in real-time.

In the secure software optimized storage system (SOTER) approach, client computers 850, 852, 854 make requests 856, 858, 860 to an application server 861. A Soter Agent 863 installed on the application server 861 listens to the tracing data which are injected in the instrumented application that runs on the application server 861, and forwards 866 the traces to the Collector 868 in the Soter Storage Intelligence service 878. Agent sends trace data asynchronously and outside the critical path to the Collector 868 over UDP. Agent can insert these trace data in the implicit approach, if needed. The application server 861 forwards the incoming requests for accessing information, updating information or create new records/objects to the Soter Storage Router 874. An optional Soter Storage Firewall 864 stands between the application server 861 and the Soter Storage Router 874. The Soter Storage Firewall 864 allows or block requests in real-time based on the nature of the current request and previous requests. The rules in Soter Storage Firewall 864 and Soter Storage Router 874 are updated by the Soter Storage Intelligence service 878 based on real-time analysis of storage and retrieval requests such that any inappropriate, unapproved or malicious transactions can be blocked. The Controller component 902 updates the routing rules in the Soter Storage Router 874 and firewall rules in the Soter Storage Firewall 864 based on the analysis of requests and application's behavior at runtime, so that any inappropriate, unapproved or malicious transactions can be blocked. The Soter Storage Router 874 identifies or inserts tags/headers that are associated with storage requests that allow it to choose between storage options such as (1) secure areas for storage of certain types of tagged data, or (2) faster locations for access, or (3) more fault-tolerant features. The Soter Storage Router 874 forwards the data storage or retrieval requests to Cloud Storage 886, SQL Database 888 or NoSQL Database 890. The functionality of the Soter Storage Firewall 864 may be integrated with that of the Soter Storage Router 874 in certain embodiments. Soter Storage Intelligence service 878 may provide various APIs 882 for integration with other cloud services. The Soter Monitoring Dashboard 884 can access 900 the Soter Storage Intelligence service 878 and presents real-time monitoring information on requests, anomalous requests detected, threats identified and blocked.

Figure 11:
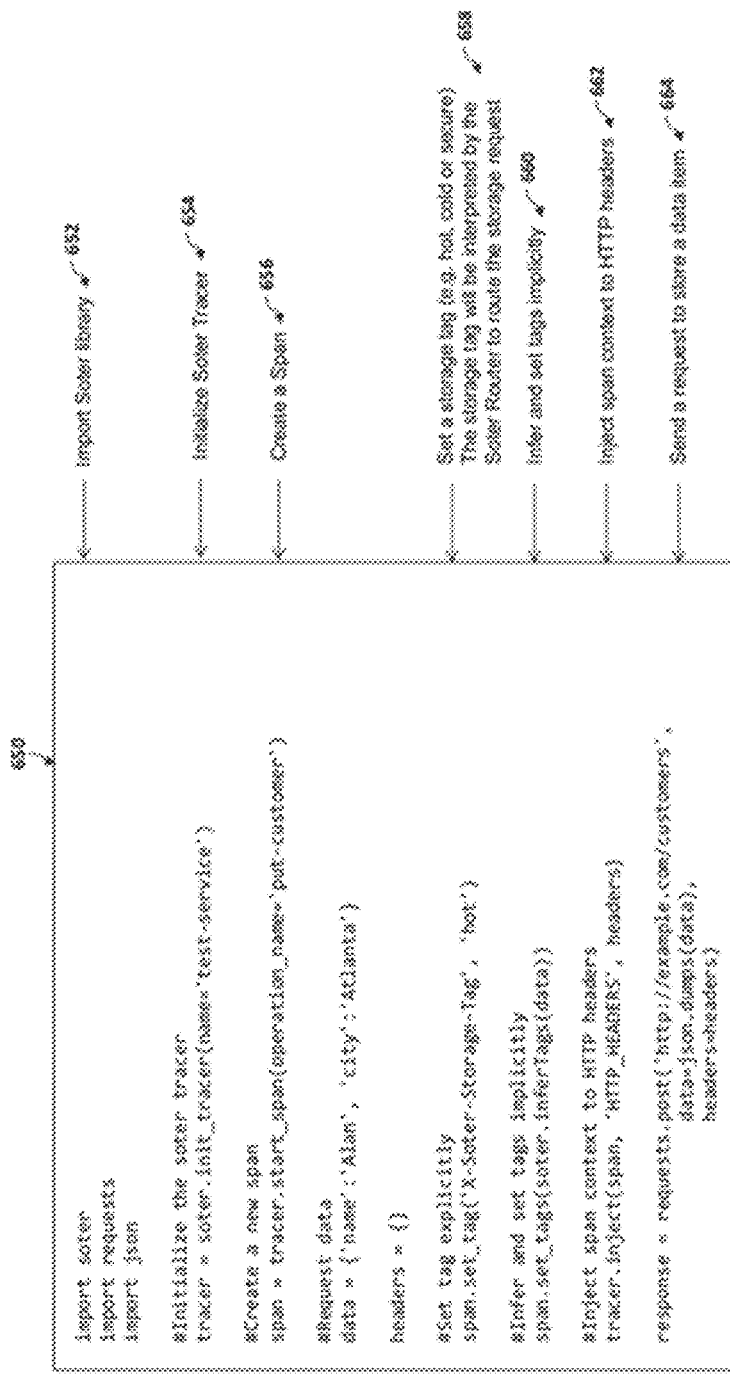
FIG. 11 is an illustration of an example of instrumenting an application for Soter to use pragma directives to optimize storage allocation, access, and protection parameters based on requested tags, according to an embodiment of the invention.

Referring now to FIG. 11, an illustration of an example of instrumenting an application for Soter to use pragma directives to optimize storage allocation, access, and protection parameters based on requested tags, is described in more detail. At step 652 the Soter Python library is imported. At step 654, the Soter Tracer is initialized. Next, a span is created at step 656. At step 658, a storage tag (e.g. "hot", "cold", "fast" or "secure") is set in the span (explicit approach). At step 660, tags are inferred and set implicitly (implicit approach). At step 662, the span context (including span ID, trace ID and tags) are injected into HTTP request headers. The explicit and implicit tags are interpreted by the Soter Router to route the storage request. At step 664, a request to store a data item is sent.

Figure 12:
FIG. 12 is an illustration of a reference implementation of a Soter Storage Router, according to an embodiment of the invention.

Referring now to FIG. 12, a reference implementation of a Soter Storage Router, is described in more detail. The program 1000 is a Python implementation of a SoterRouter class. The function for initializing the Soter Router is implemented at step 1002. At 1004, the function for binding and listen for incoming requests within the Soter Router is implemented. At step 1006, the function for accepting an incoming request is implemented. The function for sending data to a storage target is implemented at step 1008.

Figure 13:
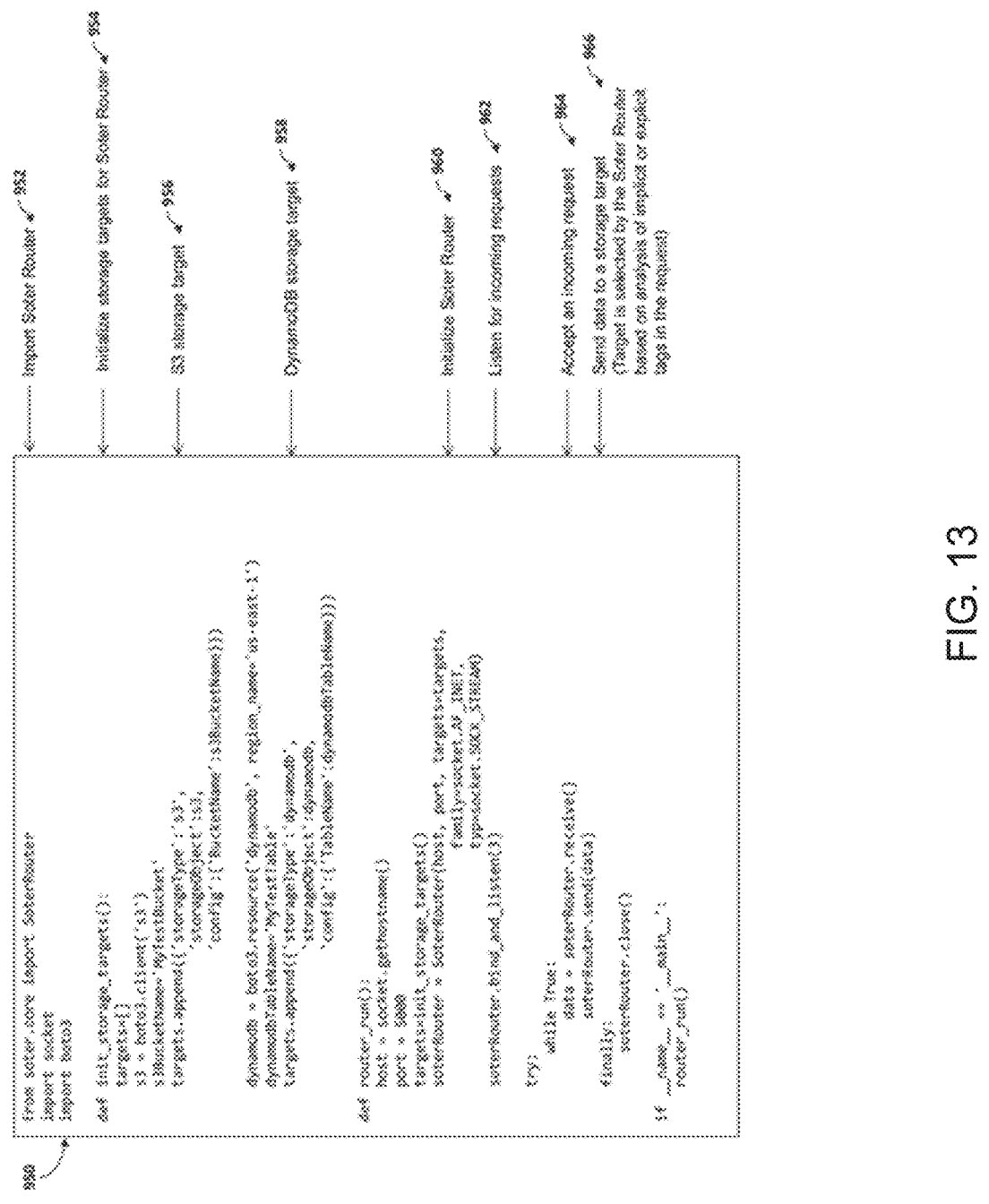

Referring now to FIG. 13, an example of using a Soter Storage Router, is described in more detail. At step 952, the Soter Router class is imported. At step 954, the storage targets for Soter Router are initialized. In this example, two storage targets are initialized at step 956 (Amazon S3 cloud storage target) and step 958 (Amazon DynamoDB NoSQL database target). At step 960, the Soter Router is initialized. At step 962, the Soter Router is set to listen for incoming requests. Incoming requests are accepted at step 964. At step 966, the send function of the Soter Router class is called to send data to a storage target. The storage target is selected by the Soter Router based on analysis of implicit or explicit tags in the request.

Figure 14:
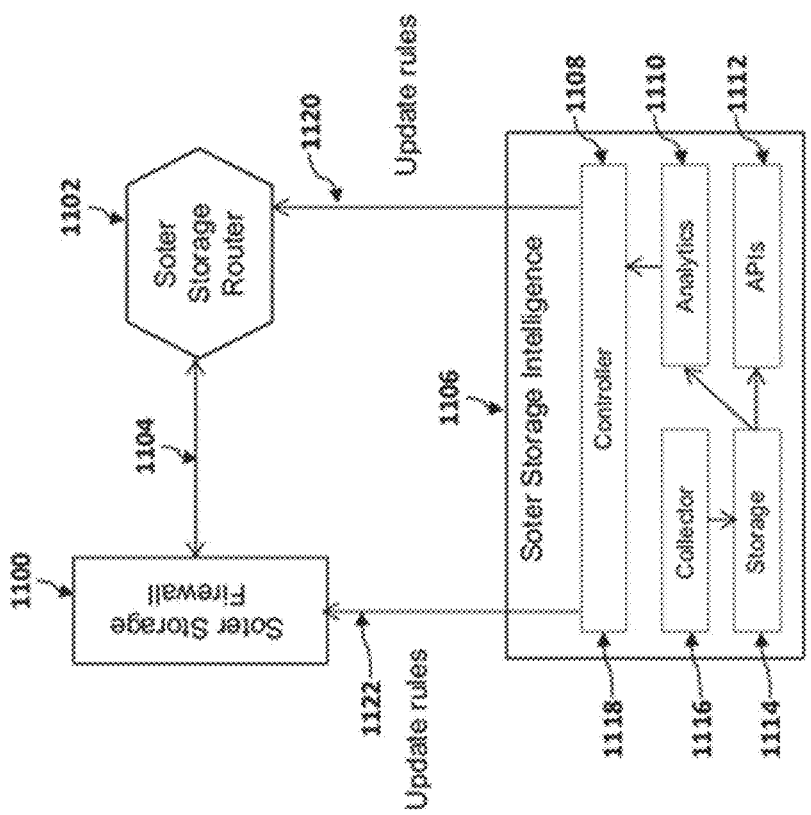
FIG. 14 is an illustration of the process to update the rules in the Soter Storage Firewall and Soter Storage Router, according to an embodiment of the invention.

Referring now to FIG. 14, an illustration of the process to update the rules in the Soter Storage Firewall and Soter Storage Router, is described in more detail. The Collector component 1116 within the Soter Storage Intelligence service 1106, collects the trace data sent by various Soter agents and stores the data in the Storage component 1114. Analysis of trace data is done in Analytics component 1110. The Analytics component 1110 may use various machine learning, deep learning and artificial intelligence (AI) models to generate rules for matching requests and adding new tags implicitly based on the data within a request. For example, the Analytics component 1110 may use AI to identify credit card numbers from the request data and tag them implicitly as "Secure". For the Analytics component 1110, machine learning or deep learning models can be trained to identify malicious operations (such as bulk querying of sensitive database records). These models can then be used to generate new rules which are updated within the Soter Storage Firewall 1100 or Soter Storage Router 1102. The Controller component 1108 updates 1122, 1120 the routing rules in the Soter Storage Router 1102 and firewall rules in the Soter Storage Firewall 1122 based on the analysis of requests and application's behavior at runtime. These rules can regulate the updates and accesses 1104 to sensitive data stored within the storage targets managed by the Soter system (such as a cloud object storage, cloud file storage, cloud SQL database and cloud NoSQL database).

Figure 15:
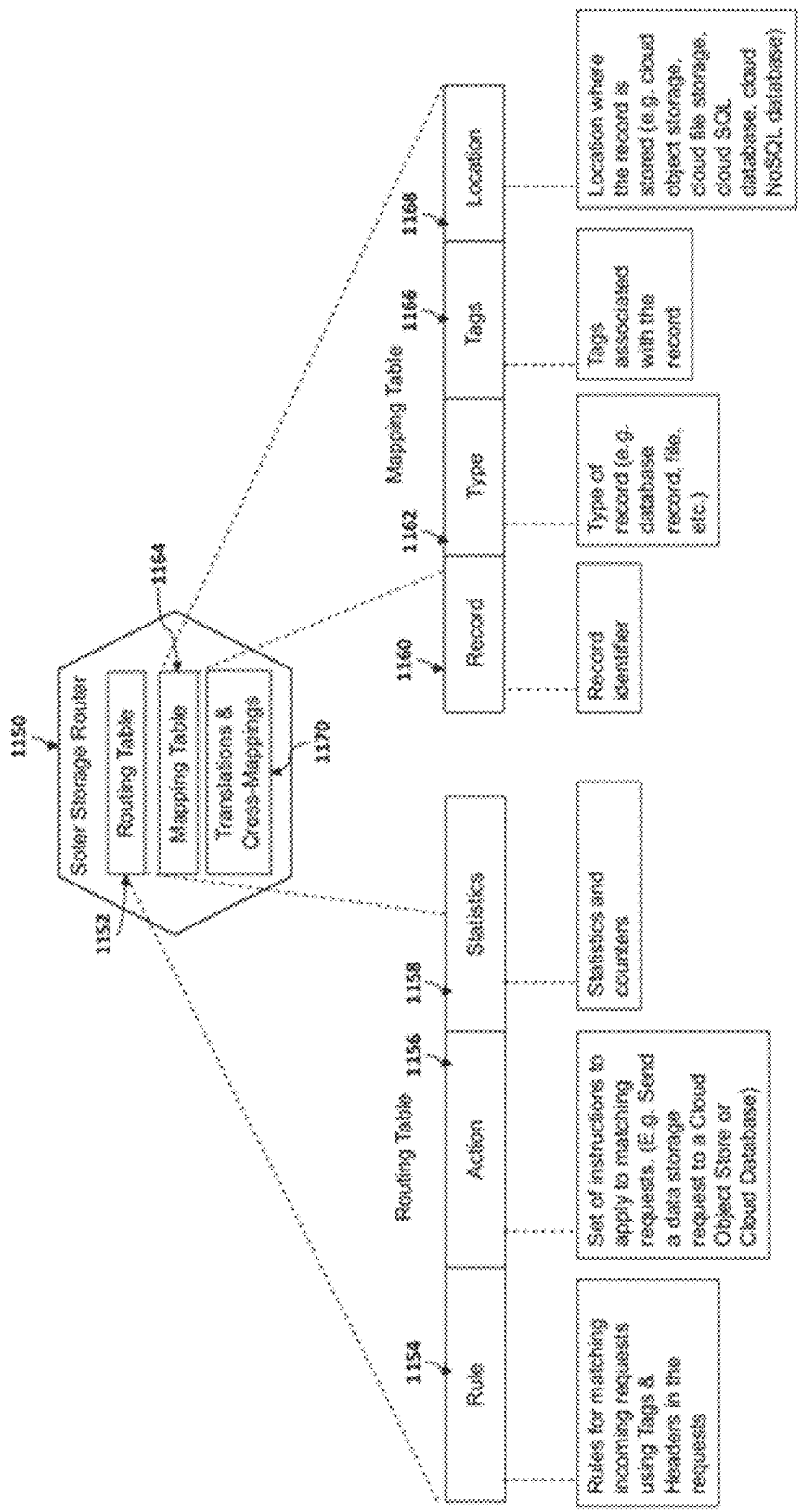
FIG. 15 is an illustration of a routing table within the Soter Storage Router, according to an embodiment of the invention.

Referring now to FIG. 15, an illustration of a routing table within the Soter Storage Router, is described in more detail. A routing table 1152 within a Soter Storage Router 1150 comprises Rules 1154, Actions 1156 and Statistics 1158. Rules 1154 are used for matching incoming requests based on the tags and headers in the requests. Actions 1156 define the set of instructions to apply to matching requests. For example, send a data storage request tagged as "Fast" to a Cloud NoSQL Database and a data storage request tagged as "Cold" to a Cloud Object Storage. A routing table 1152 may maintain various statistics and counters 1158 such as number of requests matched, number of requests with a specific tag and so on. The Soter Router 1150 maintains a mapping table 1164 which contains the mappings of records to the storage targets/locations 1168 managed by a Soter system. This mapping table can be implemented in many ways, as known to one of ordinary skill in the art, including but not limited to a distributed hash table, or a list, or a lookup table, that may be also be replicated at origin servers or edge servers within a content delivery network (CDN) such as those offered by Akamai (https://www.akamai.com/us/en/cdn/). When an application sends requests to store, create, or modify a data record/object the Soter Storage Router 1150 may assign the record/object 1160 to a storage target (such as cloud object storage, cloud file storage, cloud SQL database or cloud NoSQL database) based on the tags 1166 and headers attached to the application data request and the type 1162 of application data. The Soter Storage Router 1150 maintains mappings of records 1160 to storage locations 1168 in a cloud-based mapping database. These mappings are used when the application sends requests for querying specific data records/objects using typical structures, such as a Distributed Hash Table, as known to practitioners in the related arts. The Soter Storage Router 1150 can scramble the mappings and store them in an encrypted form to make it secure from snooping. The Soter Storage Router 1150 may maintain default mappings for certain types of requests. For example, all SQL requests to store or update data records can be mapped to the SQL database being managed by the Soter system. The Soter Storage Router 1150 also contains Translations and Cross-Mappings 1170 for translating requests from one format to another (such as SQL to NoSQL). For example, translation of an SQL request to insert a data record in an SQL database to a NoSQL database specific request.

Figure 16:
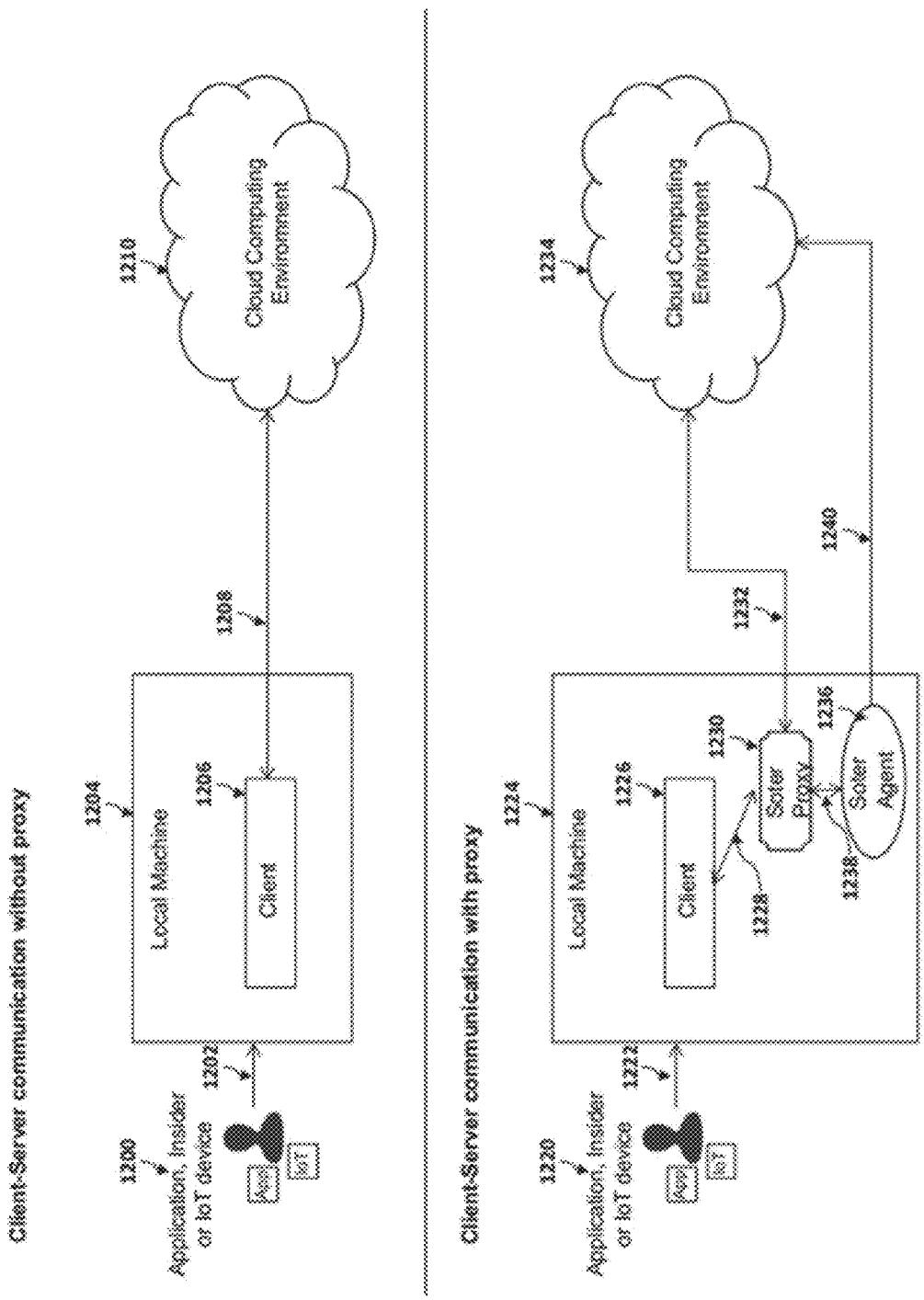
FIG. 16 is an illustration of a using Soter Proxy as a trusted man-in-the-middle for communication between client and server, according to an embodiment of the invention.

Referring now to FIG. 16, an illustration of using Soter Proxy as a trusted man-in-the-middle for communication between client and server, is described in more detail. In client-server communication approach without a proxy, the client 1206 running on a local machine 1204 of an application, insider, or IoT device 1200 communicates 1208 with the server deployed in a Cloud 1210. In client-server communication approach with a proxy, the Soter Proxy 1230 is used to intercept the client-server communication 1228 (such as database calls and requests to store data items/objects in a cloud database or storage) received from a client 1226 running on a client machine 1224 of an application, insider, or IoT device 1220. The Soter Proxy 1230 acts like a trusted man-in-the-middle intercepting the storage (create or modify) requests or database calls to allocated storage and also later manage read access requests to application data. The Soter proxy creates traces for the intercepted calls and sends 1238 the traces to the Soter Agent 1236 which is also installed on the host machine 1224. The Soter Agent 1236 listens to the tracing data (including spans) which are injected in the intercepted requests/calls by the Soter Proxy and forwards 1240 the traces to the Soter Collector deployed in the Cloud 1234. Agent sends trace data asynchronously and outside the critical path 1232 to the Collector over UDP. Agent can insert these trace data in the implicit approach, if needed.

That which is claimed is:

1. A router for optimizing performance of and securing cloud storage and databases configured to:

receive a data request from an agent application on a computerized device;

analyze data comprised by the data request;

insert a tag into the data request responsive to the analysis of the data comprised by the data request, the tag indicating storage requirements for at least one of security, access speed, or fault tolerance;
identify tracing information added to the data request transmitted by the agent application; and
transmit the tracing information to a storage intelligence service;
wherein the tracing information comprises one or more of a span and a trace.

2. The router of claim 1 wherein the router is further configured to transmit the tracing information to the storage intelligence service via a pathway other than a pathway through which the data request was transmitted.

3. The router of claim 1 wherein the agent application is executed by one of a client computerized device, a load balancer, a proxy server, or an application server.

4. The router of claim 1 wherein the router is further configured to add tracing information to the data request.

5. A method of optimizing performance of and securing cloud storage and databases comprising:
analyzing data comprised by a data request by an agent application on a computerized device, the data request being generated by a client application;
inserting a tag into the data request responsive to the analysis of the data comprised by the data request, the tag indicating storage requirements for at least one of security, access speed, or fault tolerance;
identifying tracing information added to the data request transmitted by the agent application; and
transmitting, by a router, the tracing information to a storage intelligence service;
wherein the tracing information comprises one or more of a span and a trace.

6. The method of claim 5 wherein the tracing information is transmitted to the storage intelligence service via a pathway other than a pathway through which the data request was transmitted.

7. The method of claim 5 further comprising adding tracing information to the data request.

8. The method of claim 5 wherein the agent application is executed by one of a client computerized device, a load balancer, a proxy server, or an application server.

9. The method of claim 5 wherein the steps of analyzing data comprised by the data request, and inserting the tag into the data request are performed by the router.

10. A non-transitory computer readable medium storing instructions causing a computerized device to execute a cloud storage optimization and security method, the cloud storage optimization and security method comprising:
analyzing data comprised by a data request by an agent application on a computerized device, the data request being generated by a client application;
inserting a tag into the data request responsive to the analysis of the data comprised by the data request, the tag indicating storage requirements for at least one of security, access speed, or fault tolerance;
identifying tracing information added to the data request transmitted by the agent application;
adding tracing information to the data request; and
transmitting the tracing information, by a router, to a storage intelligence service;
wherein the tracing information comprises one or more of a span and a trace.

11. The non-transitory computer readable medium of claim 10 wherein the agent application is executed by one of a client computerized device, a load balancer, a proxy server, or an application server.

12. The non-transitory computer readable medium of claim 10 wherein the tracing information is transmitted to the storage intelligence service via a pathway other than a pathway through which the data request was transmitted.

13. The non-transitory computer readable medium of claim 10 wherein the steps of analyzing data comprised by the data request and inserting the tag into the data request are performed by the router.

* * * * *